United States Patent [19]

Cunningham

[11] Patent Number: 5,206,997
[45] Date of Patent: May 4, 1993

[54] COMPRESSION-PRODUCING TOOL, USABLE AS A NUTCRACKER

[76] Inventor: Cecil Cunningham, 8 Cranford Ter., Cranford, N.J. 07016-3432

[21] Appl. No.: 871,038

[22] Filed: Apr. 20, 1992

[51] Int. Cl.⁵ .............................................. B26B 17/02
[52] U.S. Cl. .................... 30/120.4; 30/120.3
[58] Field of Search ................. 30/120.4, 120.3, 120.2, 30/120.1; 99/568, 579, 581; D7/680

[56] References Cited

U.S. PATENT DOCUMENTS

| | | | |
|---|---|---|---|
| 1,922,884 | 8/1933 | Golyer | 30/120.4 |
| 1,938,733 | 12/1933 | Walling | 30/120.4 |
| 2,758,622 | 8/1956 | Greenblatt | 30/120.4 |
| 2,989,103 | 6/1961 | Carlson | 30/120.4 |
| 4,173,825 | 11/1979 | Papalardo | 30/120.3 |
| 4,614,034 | 9/1986 | Russell, Jr. | 30/120.3 |

Primary Examiner—Frank T. Yost
Assistant Examiner—Hwei-Siu Payer
Attorney, Agent, or Firm—Spencer E. Olson

[57] ABSTRACT

A tool for producing compression, advantageously usable as a nutcracker, has two straight leg members hinged together at one end and mutually opposed jaw sections on the legs adjacent the hinge and a grasping portion remote from the hinge. The location of the hinge point is adjustable to accommodate the tool to workpieces, such as nuts, of different sizes and thereby adjust the force exerted on the workpiece when the leg members are squeezed together.

1 Claim, 1 Drawing Sheet

COMPRESSION-PRODUCING TOOL, USABLE AS A NUTCRACKER

BACKGROUND OF THE INVENTION

This invention relates to a compression-producing tool and, more particularly, to such a tool which provides improved compression effect on different sized objects and is advantageously used as a nutcracker.

Heretofore, most tools for producing compression on a workpiece did so directly, using some form of force multiplication, usually a form of lever action. When used as a nutcracker, such tools usually comprised two straight leg members, hinged together at one end and having mutually opposed roughened jaw sections on the legs adjacent the hinge and a grasping section remote from the hinge, toward the other end of the leg members. Among the disadvantages of this nut-cracker were that the size and character of the shell of the nut to be cracked affects the efficiency of the lever action; excessive force is usually required particularly if the nut is large and has a hard shell, making it difficult for children and persons with weak grasping abilities to operate it, and very little force may be exerted on a small nut even when the grasping sections are pressed into contact with each other. Partly because of the excessive force required to crack the shell of some types and/or sizes of nuts, in addition to cracking the shell, the typical nutcracker often cracked or damaged the nutmeat.

It is a primary object of the present invention to provide a compression-producing tool which can be adjusted to accommodate to workpieces of different sizes and thereby can be operated with reduced force, and greater efficiency.

A more specific object of the present invention is to provide an improved nutcracker which is reliable, simple and inexpensive.

Still another object is to provide a nutcracker which can crack and remove the shell of nuts of varying sizes without damaging the nutmeat.

SUMMARY OF THE INVENTION

Briefly, the compression-producing tool according to the invention, which is advantageously used as a nutcracker, has in common with the prior art nutcracker described above two straight leg members hinged together at one end and having mutually opposed roughened jaw sections on the leg members adjacent the hinge and a grasping portion remote from the hinge, toward the other end of the leg members. The leg members are hinged together with a hinge plate to one end of which one leg member is rigidly attached. The plate has an opening therethrough defining a plurality of spaced slots each adapted to pivotally receive a pivot pin provided at one end of the second leg member, for enabling adjustment of the location of the hinge point to accommodate the tool to nut shells of varying sizes and thereby adjust the force exerted upon the shell to provide improved lever action efficiency and minimize damage of the nutmeat.

Other objects, features and advantages of the invention will become apparent, and its construction and operation better understood, from the following detailed description read in conjunction with the accompanying drawings.

DESCRIPTION OF THE PREFERRED EMBODIMENT

Figure 2:
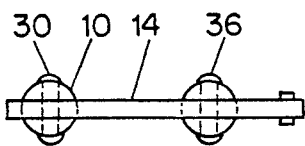
FIG. 2 is a top view of FIG. 1.
Figure 1:
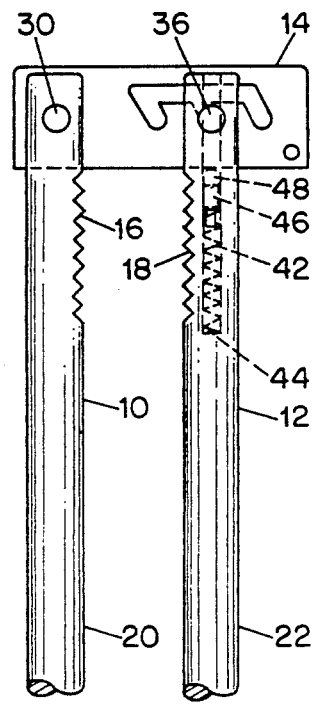
FIG. 1 is an elevation view of a preferred embodiment of a compression-producing tool constructed according to the invention.
Figure 1A:
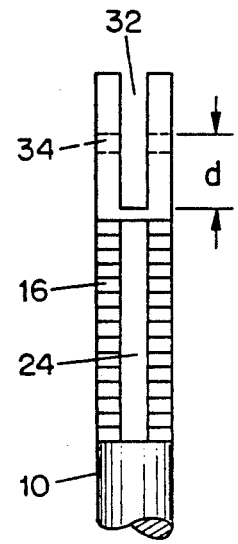
FIGS. 1A, 1B and 1C are fragmentary elevation views showing details of construction of the leg members of the device shown in FIG. 1.

Referring to the drawings, the compression-producing tool according to the invention comprises first and second leg members 10 and 12, respectively, which may be of the order of five or six inches long and about ⅜-inch in diameter, hinged together at one end by a hinge plate 14. The leg members have mutually opposed roughened jaw sections 16 and 18, respectively, adjacent the hinge plate and grasping portions 20 and 22, respectively, remote from the hinge plate, toward the other free ends of the leg members. As shown in FIG. 1A, wherein leg member 10 is rotated 90° clockwise from its position shown in FIG. 1, the "teeth" forming the roughened jaw sections may have a longitudinal groove 24 milled therein to provide additional sharp corners for enhancing the grip of the jaws on a workpiece, such as the shell of a nut.

Figure 3:
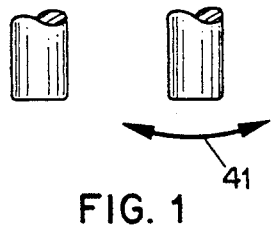
FIG. 3 is an elevation view of the hinge plate of the device shown in FIG. 1.

Hinge plate 14 typically is about two inches long, ½-inch wide and ⅜-inch thick and is made of steel. As shown in FIG. 3, the plate has an opening 26 therethrough which defines three slots 26a, 26b and 26c interconnected by a generally straight slot 26d, the long edge of which is disposed parallel to the longer sides of plate 14. The inclined slots and the interconnecting slot typically are slightly wider than ⅛-inch to provide clearance for movement of a ⅛-inch diameter pivot pin from one slot to another. The slots 26a, 26b and 26c are inclined upwardly toward one shorter edge of the plate and typically are spaced ⅜-inch apart. Plate 14 has a hole 28 therethrough near one end thereof, typically ⅛-inch in diameter and spaced ⅜-inch from the bottom of slot 26a for receiving a ⅛-inch diameter rivet 30 for securing leg member 10 to the plate at that end.

As seen in FIG. 1A, the upper end of leg member 10 has a diametral slot 32 formed therein having a width to receive hinge plate 14 therein with a press fit and a hole 34 disposed at right angles to the slot for receiving the rivet 30. The distance d between the center of hole 34 and the bottom of the slot 32 is such that the bottom of the slot firmly engages the adjacent long side of plate 14 when the rivet 30 is in place, whereby the first leg member 10 is rigidly attached to plate 14 near a first shorter edge and is co-planar therewith.

Figure 1B:
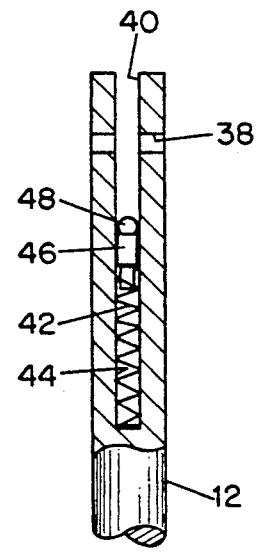
Figure 1C:
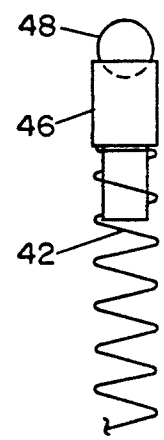

The second leg member 12 is pivotally attached to hinge plate 14 by a rivet 36, typically ⅛-inch in diameter, which extends through a diametral hole 38 drilled through the upper end of member 12 which, as is seen in FIG. 1B, is bifurcated by a slot 40 in which hinge plate 14 is received with clearance. The rivet 36 passes through opening 26 in plate 14 and serves as a pivot pin about which leg member 12 may pivot in either direction relative to the other leg member, as indicated by the arrow 41. The pivot pin 36 is releasably retained in contact with the lower extremity of a selected slot defined by opening 26 by spring-biased means contained within leg member 12. As seen in FIG. 1 and FIG. 1C, this includes a compression spring 42 engaging the bottom of a coaxial circular hole 44 drilled in leg member 12, a short cylindrical member 46, preferably formed of steel, and having a concave surface at its upper end, fitted in the upper end of spring 42, and a ball-bearing 48 supported on the concave surface of member 46 and engaging the adjacent straight longer edge of plate 14. The characteristics of the spring 42 are such as to firmly urge ball-bearing 48 into engagement with hinge plate 14, thereby to draw pivot pin 36 into secure engagement with a selected slot 26a, 26b or 26c. The depth of slot 40 in leg member 12 is so related to the distance between the lower extremity of slot 26b, for example, and the edge 26d of opening 26, that leg member 12 can be urged upwardly, against the compression of spring 42, by an amount sufficient to move the pivot pin 36 from one slot to another, whereupon the leg member is released and the spring retains the pivot in the newly-selected slot; thus, the point at which the two leg members are hinged to each other is readily adjustable from the position shown in FIG. 1, where the opposed roughened jaw sections are spaced to accommodate a medium sized nut, to either of the positions shown in FIGS. 5 and 6, wherein the tool is adjusted to crack a relatively large nut 50, or a relatively small-shelled nut 52, respectively. If desired, a stop pin 27 may be provided in the lower right hand corner of plate 14 to limit the angular movement of leg member 12.

Figure 5:
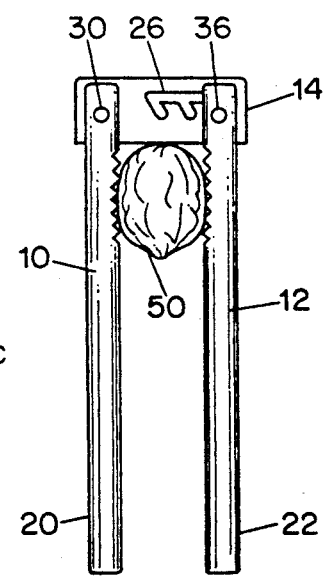
FIG. 5 is an elevation view showing the device adjusted for cracking the shell of a relatively large nut.
Figure 6:
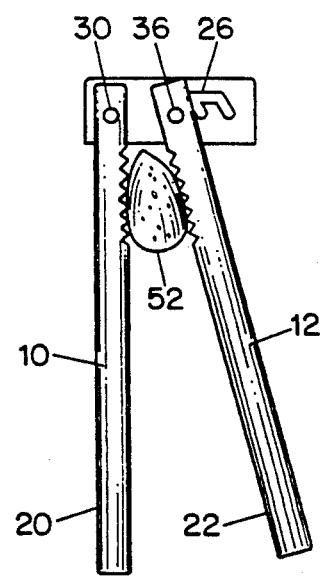
FIG. 6 is an elevation view showing the device adjusted for cracking the shell of a relatively small nut.

In operation, relatively large nuts and other workpieces can be readily accommodated by adjusting the pivot point of leg member 12 to be at a maximum distance from leg member 10 and allowing leg member 12 to spread away from leg 10 to allow the nut to be placed between the mutually opposed jaw sections. Then the gripping portions 20 and 22, which are quite far apart when the nut 50 is in place between the jaws, are squeezed together by the application of force sufficient to crack the nut shell. For medium sized nuts, that is, nuts with shells somewhat smaller than the nut 50 in FIG. 5, are to be cracked, the tool would be adjusted to the position shown in FIG. 1, and for smaller nuts 52, almonds, for example, the pivot point would be adjusted to provide the smallest spacing between the two leg members, as shown in FIG. 6.

Figure 4:
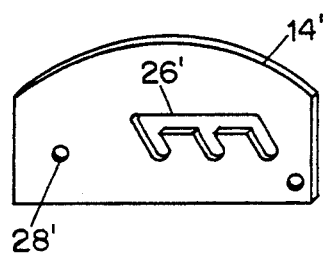
FIG. 4 is an elevation view of an alternative form of hinge plate.

FIG. 4 illustrates an alternative construction for hinge plate 14; functionally it is equivalent in that it has a hole 28' for receiving the rivet 30 and an opening 26' defining three slots for selectively receiving the pivot pin of leg member 12, and has a straight longer edge which engages ball-bearing 48. It differs in that the other longer edge is curved so as to provide an area above opening 26' on which a product name and/or a trademark may be engraved.

While the above description contains many specificities, these should not be construed as limiting the scope of the invention, but rather as an exemplification of the principles of the invention. Various other modifications will now occur to those skilled in the art. For example, the teeth on the jaw section need not be modified as shown in FIG. 1A, although this construction is preferred because of its improved gripping action. Also, while a particular spring-biased arrangement for releasably maintaining the pivot pin of leg member 12 in a selected slot has been described, the invention is not limited to this specific construction. While the device has been described for use primarily as a nutcracker, it can also be used on other workpieces, for example, as a screwtype bottle cap remover, as a pipe wrench, or for cracking lobster claws and the like. Accordingly, the scope of the invention should be determined only by the appended claims and their legal equivalents.

I claim:

1. A compression-producing tool, usable for cracking nuts of various sizes comprising:

first and second straight leg members, hinge means hingedly connecting said leg members together at one end thereof, said one end of each of said leg members being bifurcated to form a slot, the bifurcation of said second leg member being longer and wider than the bifurcation of said first leg member, and each of said leg members having mutually opposed roughened jaw sections thereon adjacent said hinge means and a grasping portion remote from said hinge means, toward the other end of said leg members, said hinge means comprising a flat, generally rectangular metal plate having a straight smooth long edge and first and second shorter edges substantially perpendicular to said straight long edge and a thickness to be received with a press fit in the slot formed in said first leg member and with clearance in the slot formed in said second leg member, said plate having an opening therethrough defining a plurality of spaced substantially parallel slots of predetermined depth closed at one end and inclined toward said first shorter edge of said hinge plate, said inclined slots having open ends interconnected by an elongate slot of substantially the same width as said spaced inclined slots and which is disposed in spaced parallel relationship with said straight long edge of said plate, fastening means for rigidly securing said hinge plate in the slot formed in said one end of said first leg member at a location near said first shorter edge thereof, the longer bifurcation of said second leg member receiving said hinge plate at a location near said second shorter edge, and means for pivotally connecting said one end of said second leg member to said hinge plate at an adjustable position with respect to said first leg member comprising a pivot pin extending diametrically through said second leg member perpendicularly to the slot formed therein at a location spaced inwardly a predetermined distance from said one end and through said opening in said hinge plate and adapted to be engageable with any of said inclined slots formed in said hinge plate, and means contained within said second leg member for retaining said pivot pin in engagement with a selected slot including a cavity formed within the upper end of said second leg member and extending downwardly from the bottom of said slot, a bearing member including a plunger slidably mounted within said cavity wherein said plunger comprises a cylinder having a concave surface at its upper end supporting a ball bearing, and a compression spring within said cavity acting on said plunger for urging the plunger upwardly and said ball bearing against said long smooth straight edge of said hinge plate whereby said pivot pin is maintained against the closed end of a selected slot and said second leg member is movable toward and away from said first leg member, and whereby said second leg member may be displaced axially, against the compression of said spring, a distance sufficient to permit said pivot pin to be disengaged from one slot and moved to another for adjusting the spacing between the location at which said second leg member is pivotally attached to said hinge plate and said first leg member so as to accommodate the tool to nuts of various sizes.

* * * * *